United States Patent
Trassy et al.

(10) Patent No.: US 8,367,008 B2
(45) Date of Patent: Feb. 5, 2013

(54) METHOD FOR PURIFYING SILICON FOR PHOTOVOLTAIC APPLICATIONS

(76) Inventors: Christian Claude Cyprien Trassy, Grenoble (FR); Yves Jean Noël Delannoy, Crolles (FR)

(*) Notice: Subject to any disclaimer, the term of this patent is extended or adjusted under 35 U.S.C. 154(b) by 239 days.

(21) Appl. No.: 12/922,621

(22) PCT Filed: Mar. 5, 2009

(86) PCT No.: PCT/EP2009/052627
§ 371 (c)(1),
(2), (4) Date: Sep. 14, 2010

(87) PCT Pub. No.: WO2009/112428
PCT Pub. Date: Sep. 17, 2009

(65) Prior Publication Data
US 2011/0005917 A1    Jan. 13, 2011

(30) Foreign Application Priority Data
Mar. 14, 2008    (FR) ..................... 08 51692

(51) Int. Cl.
*B01J 19/08* (2006.01)
*C30B 15/12* (2006.01)

(52) U.S. Cl. ............... 422/186.21; 204/164; 423/348

(58) Field of Classification Search ........... 422/186.21; 204/164; 423/348
See application file for complete search history.

(56) References Cited

U.S. PATENT DOCUMENTS

| | | |
|---|---|---|
| 5,182,091 A | 1/1993 | Yuge et al. |
| 5,972,282 A | 10/1999 | Aguirre et al. |
| 6,207,924 B1 | 3/2001 | Trassy |
| 6,236,012 B1 | 5/2001 | Carre et al. |
| 6,619,377 B1 | 9/2003 | Etay et al. |
| 6,936,546 B2 | 8/2005 | Robbins |
| 7,404,941 B2 | 7/2008 | Baluais et al. |
| 2008/0123715 A1 | 5/2008 | Trassy et al. |
| 2008/0190558 A1 | 8/2008 | Bailey et al. |
| 2010/0089310 A1 | 4/2010 | Einhaus et al. |

FOREIGN PATENT DOCUMENTS

| | | |
|---|---|---|
| CA | 2 315 019 | 7/1999 |
| EP | 0 459 421 | 12/1991 |
| EP | 0 477 784 | 4/1992 |
| EP | 1 042 224 | 10/2000 |
| FR | 2 772 741 | 6/1999 |
| FR | 2 773 299 | 7/1999 |

(Continued)

OTHER PUBLICATIONS

Alemany, C. et al.; "Refining of Metallurgical-Grade Silicon by Inductive Plasma;" Solar Energy Materials and Solar Cells, Elsevier Science Publishers, Amsterdam, NL, vol. 72, No. 1-4, Apr. 1, 2002; pp. 41-48.

(Continued)

*Primary Examiner* — Kishor Mayekar
(74) *Attorney, Agent, or Firm* — Harness, Dickey & Pierce, P.L.C.

(57) ABSTRACT

The disclosure relates to a method for purifying silicon by exposing liquid silicon to a plasma, wherein the silicon flows continuously into a channel so that the free surface thereof is exposed to the plasma. The disclosure also relates to a device for implementing the method.

17 Claims, 2 Drawing Sheets

FOREIGN PATENT DOCUMENTS

| | | |
|---|---|---|
| JP | 04-338108 | 11/1992 |
| JP | 10-273374 | 10/1998 |
| JP | 11-209195 | 8/1999 |
| WO | WO 99/32402 | 7/1999 |
| WO | WO 2005/008157 | 1/2005 |
| WO | WO 2009/083694 | 7/2009 |

OTHER PUBLICATIONS

Yuge, N. et al.; "Purification of Metallurgical Silicon Up to Solar Grade;" Solar Energy Materials and Solar Cells, Elsevier Science, vol. 34, 1994; pp. 243-250.

METHOD FOR PURIFYING SILICON FOR PHOTOVOLTAIC APPLICATIONS

CROSS-REFERENCE TO RELATED APPLICATIONS

This application is a National Phase Entry of International Application No. PCT/EP2009/052627, filed on Mar. 5, 2009, which claims priority to French Application 0851692, filed on Mar. 14, 2008, both of which are incorporated by reference herein.

FIELD OF THE INVENTION

The present invention relates to a method for purifying silicon for photovoltaic applications.

BACKGROUND OF THE INVENTION

Photovoltaic applications—photovoltaic solar cells—require silicon of very high purity, designated by the expression "SoG-silicon" (SoG being the acronym of "Solar Grade"). Typically the impurity content should be of the order of $10^{-6}$ to $10^{-5}$, i.e. of the order of 1-10 ppm. This is an average content, all the elements included in the silicon not all having the same adverse effect. For example, the tungsten content (W) should be less than 0.01 ppm, that of phosphorus (P) less than 5 ppm and the boron (B) content less than 1 ppm.

In order to obtain silicon of this quality, the use of electronic grade silicon waste is known. However, industrial demand for silicon with photovoltaic quality has become so high that these wastes are in an insufficient amount in order to meet the demand from the market; this shortage is notably expressed by a strong increase in the prices of photovoltaic grade silicon.

Moreover there exists a metallurgical process consisting of gasifying silicon, of distilling it so as to form chlorosilane which should then be converted into the silane ($SiH_4$), and then subjecting it to cracking, with which silicon powder may thereby be obtained. However, this process is characterized by a large number of operations and by emission of chlorine during the conversion of chlorosilane into silane. Further, the quality of the metallurgical silicon is less than the quality required for photovoltaic applications.

Methods have therefore been developed which consist of submitting liquid silicon to the flux of a plasma torch in which reactive gases are added capable of causing volatilization of the impurities. The reaction occurs at the liquid-plasma interface and requires rapid renewal of the gases and of the liquid at this interface. This renewal is obtained by means of electromagnetic mixing or mixing by injecting gas into the liquid silicon. However, this is a discontinuous method, so-called batch processing. Silicon is indeed contained in a crucible. The duration of the processing directly depends on the free surface and on the volume of crucible.

In order to reach a quasi-continuous method, document JP11-209195 proposes the cascading of several silicon crucibles. Each of these crucibles is equipped with electron guns, the function of which is to ensure heating of the silicon and evaporation of the phosphorus. This solution, is however, not optimum since the silicon is not renewed at the surface, the efficiency (i.e. the purification rate) decreases rapidly, and any mixing causes mixing between non-purified silicon and purified silicon inside a same crucible.

By multiplying the number of crucibles it is possible to reduce this difficulty but it makes the method complex. It requires in particular many costly handling operations. Moreover it multiplies the sources, electron guns or plasma torches.

One of the objects of the invention is therefore to propose a method for purifying silicon which allows suppression of the majority of the handling operations. Another object of the invention is to guarantee the absence of contamination of purified silicon by non-purified silicon.

SUMMARY OF THE INVENTION

According to the invention, a method for purifying silicon by exposing liquid silicon to a plasma is proposed, said method being characterized in that the silicon continuously flows in a channel so that its free surface is exposed to the plasma. The silicon flow rate Q, the length L and the width I of the channel are related to the impurity concentration variation C through the relationship:

$$\frac{C}{C_0} = \exp\left(-\frac{1}{k} \cdot \frac{lL}{Q}\right)$$

wherein $C_0$ is the initial concentration of the impurity and k is the purification time constant.

According to a first embodiment of the invention, a plurality of plasma torches generating plasma jets are positioned facing the free surface of the silicon. Preferably, said torches are staggered above the channel so that the plasma jets cover the width of the channel. A treatment for oxidizing silicon in the upstream portion of the channel and deoxidization of silicon in its downstream portion may be carried out. Said oxidizing treatment comprises the injection into the plasma of oxygen and hydrogen or steam, or a mixture of these gases. Deoxygenation comprises exposure to an argon or argon-hydrogen plasma.

According to another embodiment of the invention, the channel is arranged in a circular tank provided with baffles. In this case, said tank is exposed to the plasma generated by a torch, in such a way that the plasma generated by this torch covers a surface for which the diameter is larger than or equal to that of the tank. In a particularly advantageous way, the silicon flow rate is controlled at the inlet and/or at the outlet of the channel.

Another object relates to a device for purifying silicon, comprising:
  a means for supplying liquid silicon,
  a channel for the flow of silicon,
  means for generating a plasma,
wherein the channel and the plasma generating means are arranged so that the free surface of the silicon flowing in the channel is exposed to the plasma. The device advantageously comprises means for controlling the flow rate of silicon at the inlet and/or outlet of the channel. The silicon flow rate Q, the length L and the width I of the channel are related to the impurity concentration variation C through the relationship:

$$\frac{C}{C_0} = \exp\left(-\frac{1}{k} \cdot \frac{lL}{Q}\right)$$

wherein $C_0$ is the initial concentration of the impurity and k is the purification time constant.

According to a first embodiment of the device, the plasma is generated by a plurality of torches staggered above the channel. Preferably, the torches located in the upstream portion of the channel comprise means for injecting an oxidizing gas into the plasma and the most downstream torch comprises means for injecting a deoxygenating gas into the plasma. According to another possible embodiment of the device, the channel is arranged inside a circular tank by means of baffles, and the plasma is generated by a torch for which the flux diameter is greater than or equal to that of the tank. According to an alternative, the channel is arranged inside several successive circular tanks provided with baffles.

BRIEF DESCRIPTION OF THE DRAWINGS

Other features and advantages of the invention will become apparent from the detailed description which follows, with reference to the appended drawings wherein.

DETAILED DESCRIPTION OF THE INVENTION

Figure 1:
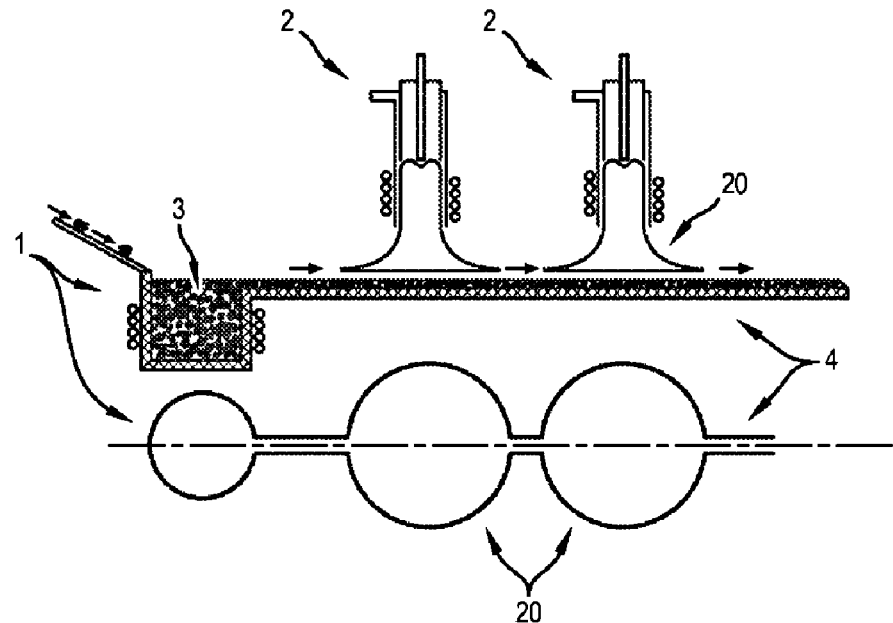
FIG. 1 is a general view of the device according to the invention.

With reference to FIG. 1, the device according to the invention comprises a device 1 for melting silicon 3, a channel 4, means 2 for generating a plasma, a mold for solidification of the silicon (not shown).

The Device for Melting Silicon

The device first comprises a melting device 1 with which solid silicon may be melted. This melting device is known per se and will therefore not be subject to a detailed description. It comprises a refractory crucible, for example in silica or in carbon, inside which the silicon blocks are melted by direct electrical heating or by induction. Induction has the advantage of providing mixing which improves heat transfer. The crucible is continuously supplied with silicon blocks so as to maintain a constant liquid level inside the crucible. The silicon introduced at the inlet is metallurgical silicon (MG—Si) or upgraded metallurgical silicon (UMG—Si) with a low content of metal impurities.

Means for Generating a Plasma

For generating the plasma, one or more plasma torches 2 of a known type are used. These torches preferably generate an argon (Ar) plasma, to which gas or gases are added, the reactive properties of which allow purification of silicon by reacting with the element(s) for which removal from silicon is desired. The argon plasma has the function of creating and maintaining ionization of the introduced reactive gases.

The plasma torch 2, with axisymmetrical geometry, generates a plasma jet 20 with a substantially cylindrical shape, which spreads out when it encounters the silicon surface 3, as this is illustrated in FIG. 1. For example, the plasma torches usually available commercially deliver a plasma jet with a diameter of 40-50 mm, with which a silicon surface with a diameter of the order of 200 mm may be covered. One skilled in the art therefore adapts the number and the arrangement of the plasma torches according to the surface to be covered.

Purification Reactions

The purification cycle of silicon typically comprises at least two phases. The first phase consists in an oxidizing treatment with which impurities such as boron and carbon may be removed, according to the following reactions:

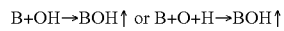

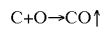

The vertical arrow indicates that the formed compounds are volatile. The introduced species O, H and/or OH are created at high temperature by injecting oxygen and hydrogen or steam, or a mixture of these gases, into the argon plasma.

This first treatment phase is therefore expressed by dissolution of oxygen and hydrogen in silicon. However, as oxygen interferes with the photovoltaic properties of silicon, it should then be removed. For this purpose, the second treatment phase is deoxygenation under the effect of an argon or argon-hydrogen plasma, promoting the following reaction:

In plasma purification, the reaction between the reactive species created by the plasma and the silicon occurs at the plasma-silicon interface. It is therefore necessary to rapidly renew the liquid and gas phases in the vicinity of this interface, failing which the reaction will be strongly slowed down. The renewal of the gas phase is rapid because of the velocity of the gases of the plasma, which is of the order of a few tens of meters per second.

As regards the liquid phase, renewal is carried out in batch methods, by electromagnetic mixing (for example described in document FR 2772741) or by the mechanical effect of a plasma jet at very high velocity (on this subject reference may be made to the publication of N. Yuge, H. Baba, Y. Sakaguchi, K. Nishikawa, H. Terashima, F. Aratami, "Purification of metallurgical silicon up to solar grade", Solar Energy Materials and Solar Cells 34 (1994) 243-250). This mixing is all the more necessary since the tank is deep and since the diffusion of the impurities from the core of the liquid towards the surface is long.

In order to reduce the effect of diffusion, the thickness of the liquid volume should be reduced; on the other hand, in order to have a sufficient exposure time to the plasma, the distance covered by the liquid needs to be increased, and therefore the dwelling time under the plasma torch. A continuous purification method applied in a deep tank does not have much benefit because mixing is required. Indeed, mixing has the effect of mixing the polluted silicon entering the tank with silicon which will have been already treated by the plasma.

On the other hand, the invention proposes a continuous method in which the silicon to be purified runs under the treatment plasma without it being possible for it to mix. This implies that exchanges in the thickness of the silicon layer are rapid as compared with the dwelling time under the plasma, i.e. the silicon thickness is very small.

The volatilization rate of the impurities, in a first approximation, depends on the concentration in the liquid phase and on the reaction surface:

$$M_{volatilized} = k \cdot A \cdot C_x$$

wherein:

$M_{volatilized}$ is the mass of impurity removed from the liquid per unit time, A is the contact surface area between the plasma and the liquid silicon, a so-called "active surface" of the tank, $C_x$ is the concentration of impurity x in silicon, k is the reaction constant, depending on the operating conditions: temperature of the silicon, plasma power, argon flow rate, nature of the reactive gases, concentration of the reactive gases in the plasma.

Moreover, the purification time constant k depends on the thickness of liquid silicon:

$$dC/C = k \cdot A/V = k/h$$

wherein:
V is the volume of silicon,
h is the thickness of liquid silicon.

Purification Channel

One of the originalities of the invention lies in the continuous flow of liquid silicon in a channel 4 exposed in every point—or on the major part of its path—to the plasma 20. The search for maximum efficiency leads to recommending total exposure. This channel is arranged in an enclosure, the atmosphere of which is controlled.

By channel is meant in this text a conduit which may have a rectangular or semi-circular or elliptical section, provided with an inlet and an outlet so as to allow the flow of a fluid, the depth of the conduit being small as compared with its length; it is specified that the section of such a conduit is further open in its upper portion so that the free surface of the fluid which flows therein is accessible to the reactive gases and the plasma.

The dimensioning of the channel is further intimately related to the exposure time to the plasma. Indeed, it is necessary to observe an exposure time/silicon thickness ratio such that the impurities have time for diffusing towards the surface in order to be volatilized and removed. Thus, for obtaining satisfactory results, this ratio may be determined by using the relationship:

$$\frac{C}{C_0} = \exp\left(-\frac{1}{k} \cdot \frac{lL}{Q}\right)$$

wherein $C_0$ is the initial concentration of the relevant impurity, Q is the liquid silicon flow rate, l is the width of the channel and L the length of the channel.

The required dwelling time depends on the concentration at the inlet and on the desired concentration at the outlet; this dwelling time is controlled by the liquid silicon flow rate at the inlet of the reactor. In order to limit mixing between the upstream and downstream sections, the length/width ratio of the channel should be greater than 10, without there being any upper limitation, and the depth/width ratio of the channel should be less than 0.3. The lower limit is simply determined by the necessity of maintaining a controlled thickness of liquid silicon.

Figure 4:
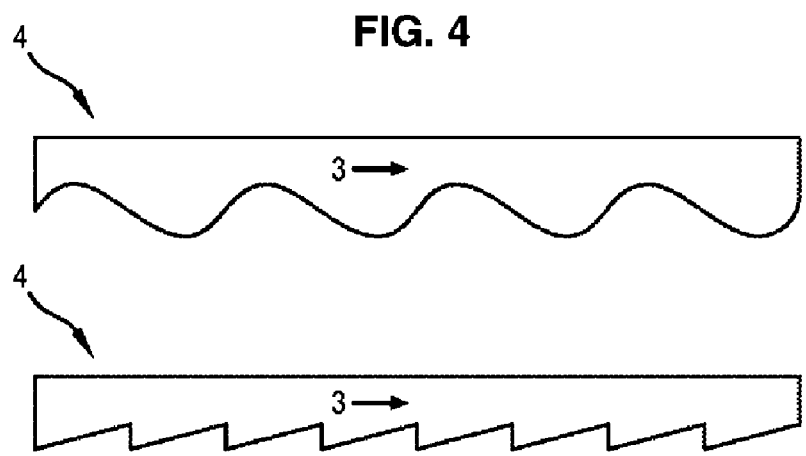
FIG. 4 shows two longitudinal sections of the channel with two possible embodiments of the bottom.

The path of the channel 4 may assume different shapes. The channel may thus be rectilinear or be formed with several rectilinear portions, but it may also be arranged inside a given surface—for example a circular surface—by means of baffles. In order to improve mixing, the internal surface of the channel may be rough or textured, or preferably have corrugations or a saw-tooth profile, the amplitude of which is at least equal to half the height of the channel. The goal is to increase local turbulence in order to improve mixing and local homogenization of the liquid silicon bath. FIG. 4 illustrates two possible configurations of the bottom of the channel 4, the silicon flow 3 being illustrated by an arrow.

The temperature of the channel should be adapted so that the silicon remains liquid—the melting temperature of silicon being of the order of 1,414° C.—while maintaining this temperature below 1,700° C. in order to limit thermal evaporation of the silicon. For this purpose, a channel in graphite or silica or in any other refractory material compatible with silicon is used. This channel may be directly heated for example by induction, in the case of graphite, or heated via a susceptor (i.e. an indirect heating element coupled with an induction heating device) when it is a non-conducting material. It is provided with means for controlling the temperature.

Figure 2:
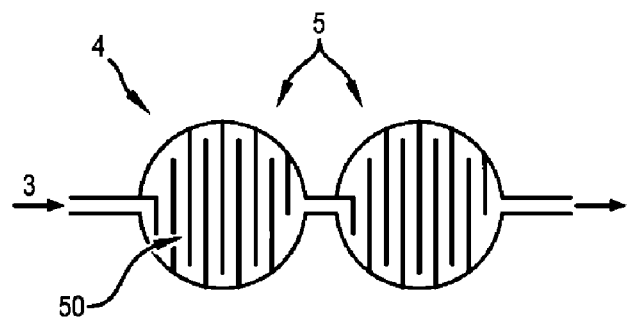
FIG. 2 illustrates a first embodiment of the invention.

According to a first embodiment, illustrated in FIG. 2, the channel 4 is arranged in a circular tank 5 with low depth by means of a series of baffles 50, the surface of the tank 5 being such that it is entirely exposed to the plasma jet stemming from a single torch with circular geometry. The internal diameter of the torch is comprised between 40 and 160 mm, depending on the power (from 10 kW to 1 MW). The diameter of the tank depends on the power and on the diameter of the torches; it is comprised between 10 cm and 1 m. Thus, the silicon is forced to cover a long distance under the plasma, and to therefore dwell for a long time under the plasma flux.

Depending on the required exposure time and/or on the power of the plasma torches used, it is optionally possible to place in series several tanks 5 comprising such baffles. FIG. 2 thus illustrates a device with a channel placed inside two successive circular tanks 5. In this case, the plasma torch(es) is(are) preferably high power torches, i.e. of more than 10 to 20 kW.

Figure 3:
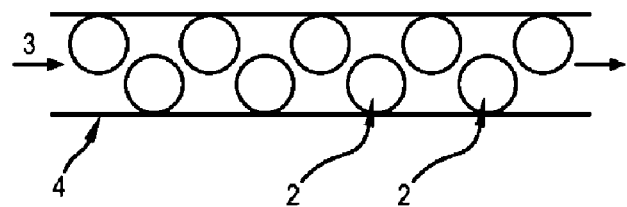
FIG. 3 illustrates a second embodiment of the invention.

According to a second embodiment, a plurality of plasma torches is placed above a rectilinear channel so that the whole free surface of the silicon is exposed to the plasma. Advantageously, low power plasma torches staggered above the channel are used for this purpose, as illustrated in a top view in FIG. 3. In this figure, the circles represent the diameter of the torches 2, but it is recalled that the surface covered by the plasma has a diameter three to ten times greater depending on the velocity of the gases from the plasma. Thus, the whole free surface of the silicon is exposed to the plasma. According to this embodiment, it may be tolerated that a small portion of the free surface is not exposed to the plasma, but this would be done at the expense of the yield of the method.

In a particular advantageous way, this configuration gives the possibility of introducing into the different plasma torches, different gases, so as to carry out during the flow of the silicon, a plurality of successive treatments adapted to the initial composition of the silicon. In particular, it is advantageously possible to carry out the oxidizing treatments by means of plasma torches located above the upstream portion of the channel, and to carry out the deoxygenation treatment under the torch which is located the most downstream. Thus, at the end of the method, the silicon has undergone all the required treatment steps, whereas in a conventional batch treatment, both phases are successively linked up. Regardless of the embodiment applied, with the channel it is possible to prevent any mixing between the inflowing polluted silicon and the outflowing purified silicon, while providing local mixing by means of the plasma.

Dimensioning of the Channel

As discussed above, the dimensioning of the channel depends on several parameters. The main parameters are:

the desired purification level, expressed as the ratio $C/C_0$, wherein C is the desired final concentration of the impurity and $C_0$ is the initial concentration;

the purification time constant k, which essentially depends on the reactive gas content of the plasma and on the surface temperature of the silicon—in particular, the constant k decreases with the temperature of the silicon. One skilled in the art knows how to measure this quantity;

the dwelling time of the silicon under the plasma;

the liquid silicon flow rate.

In practice, in order to dimension the channel, one skilled in the art may use the following approach:

starting from the desired purification level, the required dwelling time under the plasma will be determined;

taking into account the k coefficient, the temperature and the concentration of the gases may be inferred therefrom;

the silicon flow rate and the dimensions (section, length) of the channel will then be inferred therefrom.

The thickness of liquid silicon moreover depends on the embodiment of the purification method. Indeed, a small thickness gives the possibility of facilitating evaporation of the impurities, but the smaller this length, the more delicate is the heat control, the silicon evaporating more easily, thereby generating a lowering of the yield. The heat transfers between the silicon and the plasma may be modeled by means of calculation codes known to one skilled in the art. For example, if a plasma torch of a large size or of strong power is used, a larger thickness of silicon will be used in order to avoid the risks of overheating.

Means for Controlling the Silicon Flow Rate

In addition to the thickness of the liquid silicon in the channel, an essential parameter of the purification method is the exposure time to the plasma. Indeed, the longer the exposure to the plasma, the higher is the purification level of the plasma. The control on this exposure time is carried out by means of controlling the silicon flow rate at the inlet and at the outlet of the channel. For this purpose, electromagnetic valves are used or any other device allowing the flow rate to be controlled without introducing additional contamination.

Solidification of the Silicon

Finally, the output of the channel opens out into a crucible in which the purified silicon is cooled and crystallized.

Comparative Results

Figure 5:
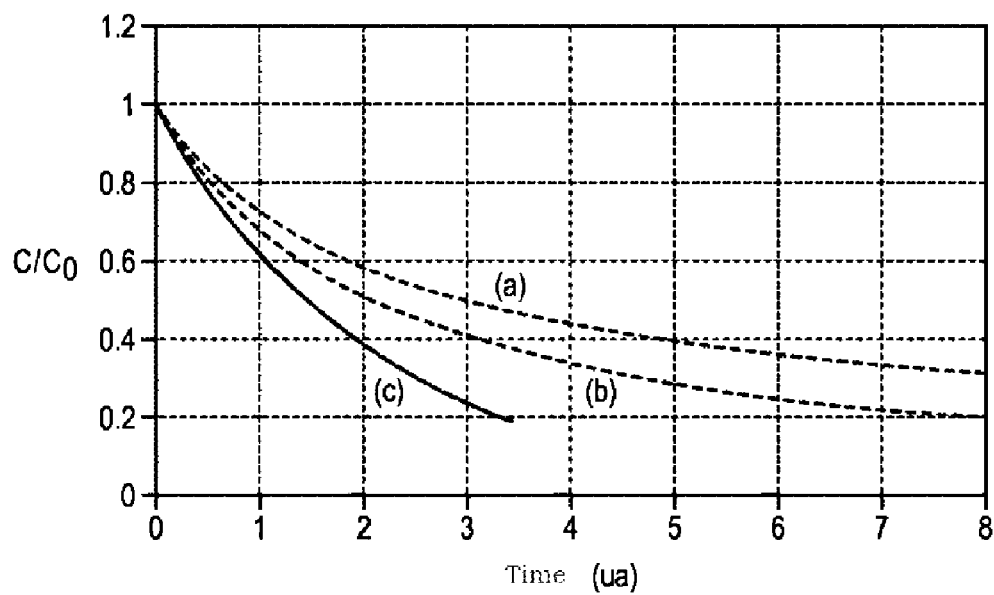
FIG. 5 is a graph comparing the performances of different methods.

FIG. 5 compares the required treatment times for reducing in a given ratio the impurity concentrations with different methods:

curve (a) illustrates the result obtained with a semi-continuous batch method with a single tank;

curve (b) illustrates the result obtained with a semi-continuous batch method with two tanks placed in series;

curve (c) illustrates the result obtained with the continuous method according to the invention.

These results confirm that with the method according to the invention, silicon may be obtained, the purity of which is of the same order of magnitude than that with batch methods of the prior art, but within a significantly reduced treatment time.

The invention claimed is:

1. A method for purifying silicon, the method comprising exposing liquid silicon to a plasma, generated by a plasma torch, wherein the liquid silicon continuously flows in a channel so that a free surface of the liquid silicon is exposed to the plasma.

2. The method according to claim 1, wherein a flow rate (Q) of the silicon, a length (L) and a width of the channel are related to the impurity concentration variation (C) through the relationship:

$$\frac{C}{C_0} = \exp\left(-\frac{1}{k} \cdot \frac{lL}{Q}\right)$$

wherein $C_0$ is an initial concentration of the impurity and k is the purification time constant.

3. The method according to claim 1, further comprising positioning a plurality of plasma torches generating plasma jets, facing the free surface of the silicon.

4. The method according to claim 3, further comprising staggering the torches above the channel so that the plasma jets cover the width of the channel.

5. The method according to claim 1, further comprising in an upstream portion of the channel, carrying out an oxidizing treatment of the liquid silicon, and in a downstream portion of the channel, carrying out deoxygenation of the liquid silicon.

6. The method according to claim 5, wherein the oxidizing treatment comprises injecting oxygen and hydrogen or steam, or mixtures thereof, into the plasma.

7. The method according to claim 5, wherein the deoxygenation of the liquid silicon comprises exposing the liquid silicon to an argon or argon-hydrogen plasma.

8. The method according to claim 1, further comprising arranging the channel in a circular tank provided with baffles, said baffles defining the channel.

9. The method according to claim 8, further comprising exposing the tank to the plasma generated by the plasma torch, the plasma covering a surface of the tank, for which the diameter of the plasma is larger than or equal to that of the tank.

10. The method according to claim 1, further comprising controlling at least one of an inlet and outlet of the channel.

11. A silicon purification device comprising:
a crucible for supplying liquid silicon;
a channel for allowing flowing of the silicon; and
at least one torch for generating a plasma;
the channel and the torch being arranged in such a way that a free surface of the liquid silicon flowing in the channel is exposed to the plasma.

12. The device according to claim 11, further comprising a valve for controlling a liquid silicon flow rate at at least one of an inlet and outlet of the channel.

13. The device according to claim 11, wherein a silicon flow rate (Q), a length (L) and a width of the channel are related to the impurity concentration variation (C) through a relationship:

$$\frac{C}{C_0} = \exp\left(-\frac{1}{k} \cdot \frac{lL}{Q}\right)$$

wherein $C_0$ is an initial concentration of the impurity and k is the purification time constant.

14. The device according to claim 11, wherein the plasma is generated by a plurality of the torches staggered above the channel.

15. The device according to claim 14, wherein a plurality of the torches are located in an upstream portion of the channel and comprise means for injecting an oxidizing gas into the plasma and in that a most downstream torch comprises means for injecting a deoxygenating gas into the plasma.

16. The device according to claim 11, wherein the channel is arranged inside a circular tank and defined by baffles within the tank, a flux diameter of the plasma of which is larger than or equal to that of the tank.

17. The device according to claim 16, wherein the channel is arranged inside several successive circular tanks provided with baffles.

* * * * *